(12) United States Patent
Mula et al.

(10) Patent No.: US 9,673,934 B2
(45) Date of Patent: Jun. 6, 2017

(54) ERROR CORRECTION ON DEMAND

(71) Applicant: Mellanox Technologies TLV Ltd., Ra'anana (IL)

(72) Inventors: Liron Mula, Ramat Gan (IL); Ran Ravid, Tel Aviv (IL); Oded Wertheim, Zichron Yaakov (IL); Ran Sela, Givat Shmuel (IL); Roy Kriss, Netanya (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 0 days.

(21) Appl. No.: 14/870,031

(22) Filed: Sep. 30, 2015

(65) Prior Publication Data
US 2017/0093526 A1    Mar. 30, 2017

(51) Int. Cl.
*H03M 13/00*    (2006.01)
*H04L 1/00*    (2006.01)
*H04L 29/08*    (2006.01)

(52) U.S. Cl.
CPC .......... *H04L 1/0045* (2013.01); *H04L 1/0041* (2013.01); *H04L 69/323* (2013.01); *H04L 69/324* (2013.01)

(58) Field of Classification Search
CPC ... H04L 1/0045; H04L 1/0041; H04L 69/323; H04L 69/324
See application file for complete search history.

(56) References Cited

U.S. PATENT DOCUMENTS

| | | | |
|---|---|---|---|
| 2011/0310978 A1* | 12/2011 | Wu | H04N 19/44 375/240.25 |
| 2013/0326308 A1* | 12/2013 | Angelopoulos | H03M 13/373 714/758 |
| 2014/0376566 A1 | 12/2014 | Mehta et al. | |
| 2015/0381316 A1 | 12/2015 | Basso et al. | |
| 2016/0094311 A1 | 3/2016 | Su et al. | |
| 2017/0012738 A1 | 1/2017 | Mantiply et al. | |

* cited by examiner

*Primary Examiner* — Sam Rizk
(74) *Attorney, Agent, or Firm* — D.Kligler IP Services Ltd.

(57) ABSTRACT

Communication apparatus includes a PHY interface, which is configured to receive over a communication link and to decode a sequence of symbols arranged in a series of data blocks. The PHY interface includes an error correction circuit, which when actuated, corrects errors in decoded data symbols using FEC symbols in the data blocks. The decoded data include data packets containing respective error detection codes. A memory buffers the data blocks received by the PHY interface. A data link layer interface receives the data packets from the PHY interface, checks the data packets using respective error detection codes, and upon detecting an error in a given data packet, signals the PHY interface to read from the memory at least one buffered data block that contains the given data packet while actuating the error correction circuit to correct the error using the FEC symbols in the at least one buffered data block.

16 Claims, 3 Drawing Sheets

ERROR CORRECTION ON DEMAND

FIELD OF THE INVENTION

The present invention relates generally to data communications, and particularly to methods and apparatus for correction of data errors in packet network communications.

BACKGROUND

Packet data networks are generally built on a multi-layer communication model, such as the Open Systems Interconnection (OSI) model. The lowest layer in the model, referred to as Layer 1, is the physical layer (PHY), in which a transmitter transmits a raw bit stream over a physical medium to a receiver. The next layer (Layer 2) is the data link layer, which provides a protocol for reliable transmission of data frames, also referred to as packets, between two nodes connected by a physical layer. Common data link layer protocols include Ethernet and InfiniBand Layer 2.

In many networks, error detection and/or error correction capabilities are built into both the Layer 1 and Layer 2 protocols. For example, the Layer 1 protocol may provide for forward error correction (FEC), in which redundant bits are added to the data stream by the transmitter and can then be used by the receiver in detecting and correcting bit errors. Many FEC schemes use block codes, such as Reed-Solomon, BCH, parity, or Hamming codes. In Layer 2 protocols, the transmitter typically incorporates a cyclic redundancy code (CRC) into a field of each packet, generally the packet footer. The receiver computes the CRC of each incoming packet and compares the result to the CRC field in the packet footer in order to identify "bad packets," in which errors have occurred.

SUMMARY

Embodiments of the present invention that are described hereinbelow provide methods and apparatus for efficient error correction in a data receiver.

There is therefore provided, in accordance with an embodiment of the invention, communication apparatus, which includes a physical layer (PHY) interface, which is configured to receive over a communication link and to decode a sequence of symbols arranged in a series of data blocks. The symbols in each data block include a first set of data symbols that encode data, which include data packets containing respective error detection codes, and a second set of forward error correction (FEC) symbols computed over the data encoded in the data block. The PHY interface includes an error correction circuit, which is configured, when actuated, to correct errors in the decoded data symbols using the FEC symbols. A memory is configured to buffer the data blocks received by the PHY interface. A data link layer interface is coupled to receive the data packets from the PHY interface and to check the data packets using the respective error detection codes. Upon detecting an error in a given data packet, the data link layer interface signals the PHY interface to read from the memory at least one buffered data block that contains the given data packet while actuating the error correction circuit to correct the error using the FEC symbols in the at least one buffered data block, and following correction of the error, to return the given data packet to the data link interface for further processing.

In some circumstances, the error correction circuit is not actuated until the error is detected by the data link layer interface, and is deactuated when error-free reception has been restored after processing the given data packet.

Additionally or alternatively, the data link interface is configured to send flow control instructions over the communication link to a transmitter of the data so as to delay transmission of further data packets by the transmitter during the correction of the error.

Typically, the data blocks have a predefined block size, and the data packets have respective packet sizes that are different from the block size and have packet boundaries that do not coincide with block boundaries of the data blocks. In one embodiment, the at least one buffered data block that contains the given data packet includes a plurality of the buffered data blocks that together contain the given data packet and which are processed by the error correction circuit in order to correct the error in the given data packet.

Further additionally or alternatively, the error correction circuit is configured, before being actuated, to check the decoded data symbols using the FEC symbols, and upon encountering a syndrome error in a given data block, to enter an actuated mode and while in the actuated mode, to read from the memory at least the given data block, to correct the syndrome error using the FEC symbols in the given data block, and following correction of the syndrome error, to pass the given block to the data link interface for further processing.

In some embodiments, the PHY interface includes packet detection logic, which is configured to assign respective serial numbers to the data blocks that are conveyed from the PHY interface to the data link layer interface, and rewind logic, which is configured to receive a signal from the data link layer interface indicating that the error was detected and responsively to the signal and to the assigned serial numbers, to select the at least one buffered data block to be input to the error correction circuit. In a disclosed embodiment, the data link layer interface is configured to acknowledge to the rewind logic that it has processed the data blocks conveyed from the PHY interface, and to signal the error by passing a negative acknowledgment to the rewind logic.

There is also provided, in accordance with an embodiment of the invention, a method for communication, which includes receiving, in a physical layer (PHY) interface, over a communication link and decoding a sequence of symbols arranged in a series of data blocks. The symbols in each data block include a first set of data symbols that encode data, which include data packets containing respective error detection codes, and a second set of forward error correction (FEC) symbols computed over the data encoded in the data block. The data blocks received by the PHY interface are buffered in a memory. The data packets are passed from the PHY interface to a data link layer interface. In the data link layer interface, the data packets are checked using the respective error detection codes, and upon detecting an error in a given data packet, the PHY interface is signaled to read from the memory at least one buffered data block that contains the given data packet and to actuate an error correction function in the PHY interface to correct the error using the FEC symbols in the at least one buffered data block. Following correction of the error, the given data packet is returned to the data link interface for further processing.

The present invention will be more fully understood from the following detailed description of the embodiments thereof, taken together with the drawings in which:

DETAILED DESCRIPTION OF EMBODIMENTS

Overview

Figure 1:
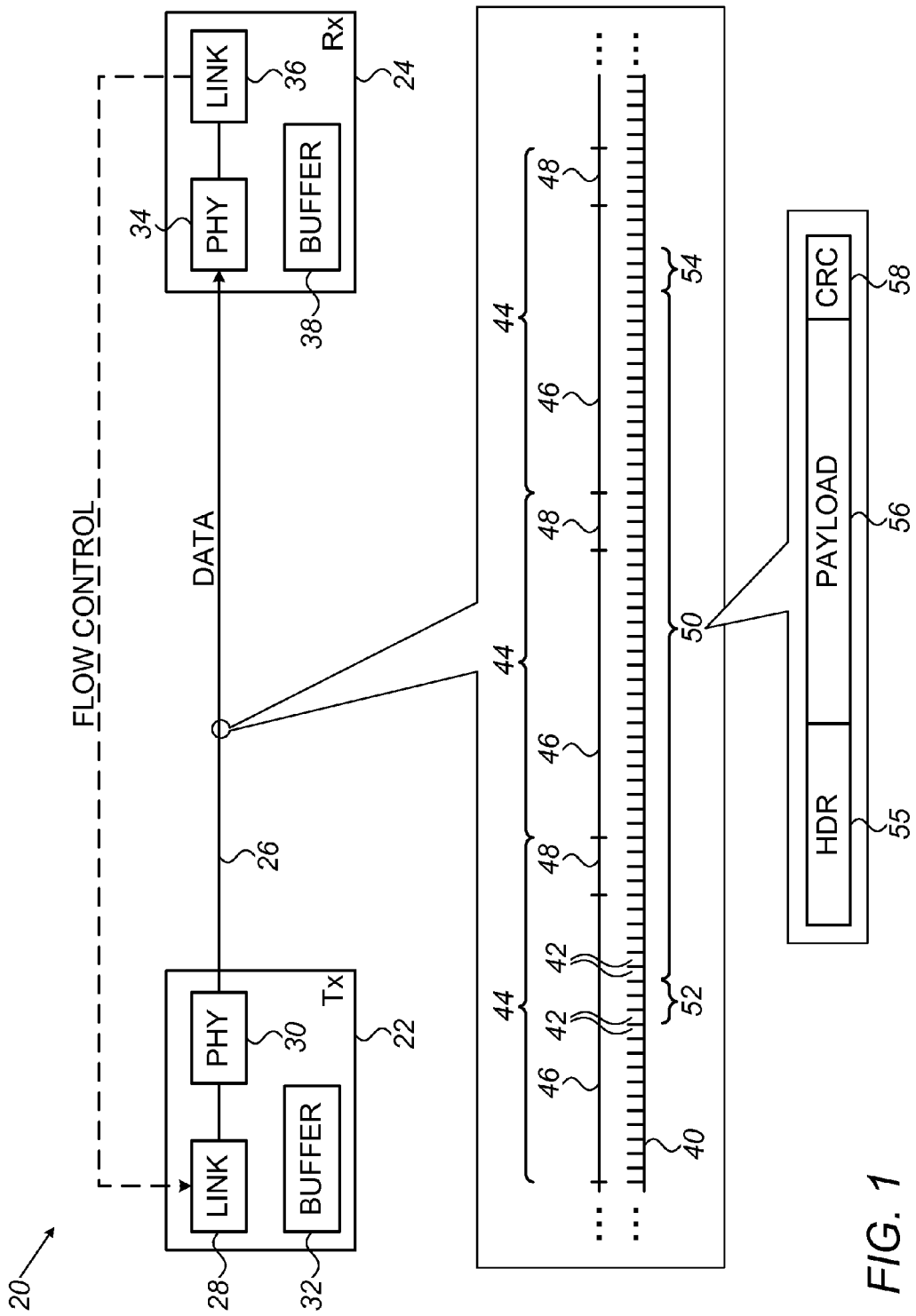
FIG. 1 is block diagram that schematically illustrates a data communication network, in accordance with an embodiment of the invention.

Physical-layer FEC can be critical in maintaining reliable communications over noisy links, in which bit errors are common. This added reliability comes, however, at the cost of added latency in the receiver, since error correction in any given FEC block can start only after the entire block, including redundant bits, has reached the receiver. In other words, the PHY interface of the receiver is able to pass the data in a given block to the data link layer for packet processing only after a delay equal to at least the block size (in bits) divided by the bit rate of the link.

In many networks, however, the bit-error rate is very low, and only a small fraction of the FEC blocks will actually contain errors. Furthermore, packet error checking in the data link layer of the receiver will detect almost all bit errors, except in those rare cases, occurring with low probability, in which two or more bit errors occur in the same packet in a manner that escapes detection by CRC checking. On data links with low bit-error rates, the penalty of added latency that is incurred by physical-layer error correction in the receiver may outweigh its benefit.

Embodiments of the present invention that are described herein address this problem by applying physical-layer error correction in the receiver selectively. Specifically, the error correction circuit in the PHY interface of the receiver will normally operate only as a retrospective error detection mechanism, and the PHY interface will therefore pass data as received to the data link layer interface, while buffering incoming data blocks temporarily. The data link layer interface checks the error correction code of each packet in the data and, when no errors are found, acknowledges the packet data to the PHY interface, which then releases the corresponding buffers.

Upon detecting a packet error, however, the data link layer interface signals the PHY interface, indicating that an error was found in the current packet. The PHY interface "rewinds" to the data block or blocks in the buffer that contain this packet (since PHY block boundaries do not generally coincide with packet boundaries), and actuates the error correction circuit. The data from the buffer is "replayed" through the error correction circuit to correct the data in the packet in question, using the FEC symbols in the data blocks. Following correction of the error, the PHY interface returns the data packet to the data link layer interface for further processing.

In some embodiments, while the rewind and correction cycle is going on, the data link layer interface sends flow control instructions back to the transmitter so as to delay transmission of further data packets by the transmitter during the correction of the error. Alternatively, the "on-demand" operation of the PHY-level error correction mechanism can be implemented independently of any sort of flow control, maintaining full wire-speed transmission on the communication link.

Thus, the error correction circuit in the PHY interface is not actuated until an error is actually detected, and it is deactuated when error-free reception has been restored after processing the data packet in which the error was detected. As a result, the PHY interface can usually operate with latency of no more than one or a few symbols, rather than an entire block. Although the latency increases abruptly when errors are detected, buffering in the PHY interface and/or flow control in the data link layer enable the receiver to absorb and compensate for these changes without data loss until error-free performance is restored.

System Description

FIG. 1 is block diagram that schematically illustrates a data communication network 20, in accordance with an embodiment of the invention. In this simplified example, network 20 comprises a single transmitter 22 and a single receiver 24, connected by a physical link 26 (although embodiments of the present invention will typically be applied in more complex networks, having many nodes that both transmit and receive). Transmitter 22 and receiver 24 may, for example, be deployed as ports of switches in network 20 or of a network interface controller that connects a host computer to the network.

Transmitter 22 comprises a data link layer interface 28, which assembles data packets for transmission over link 26, in accordance with the applicable data link layer protocol. A PHY interface 30 encodes the data in the packets as a sequence of data symbols in a series of data blocks and computes and adds FEC symbols to each data block, in accordance with the applicable physical layer protocol on link 26. An output buffer 32 comprises memory, which stores packet data temporarily until the transmitted packets have been acknowledged by receiver 24 and thus enables transmitter 22 to accommodate flow control instructions from the receiver without substantial data loss. Although flow control can be used in conjunction with some embodiments of the present invention, however, it is not an essential feature; and furthermore, flow control can alternatively be implemented without the use of an output buffer in transmitter 22.

Figure 3:
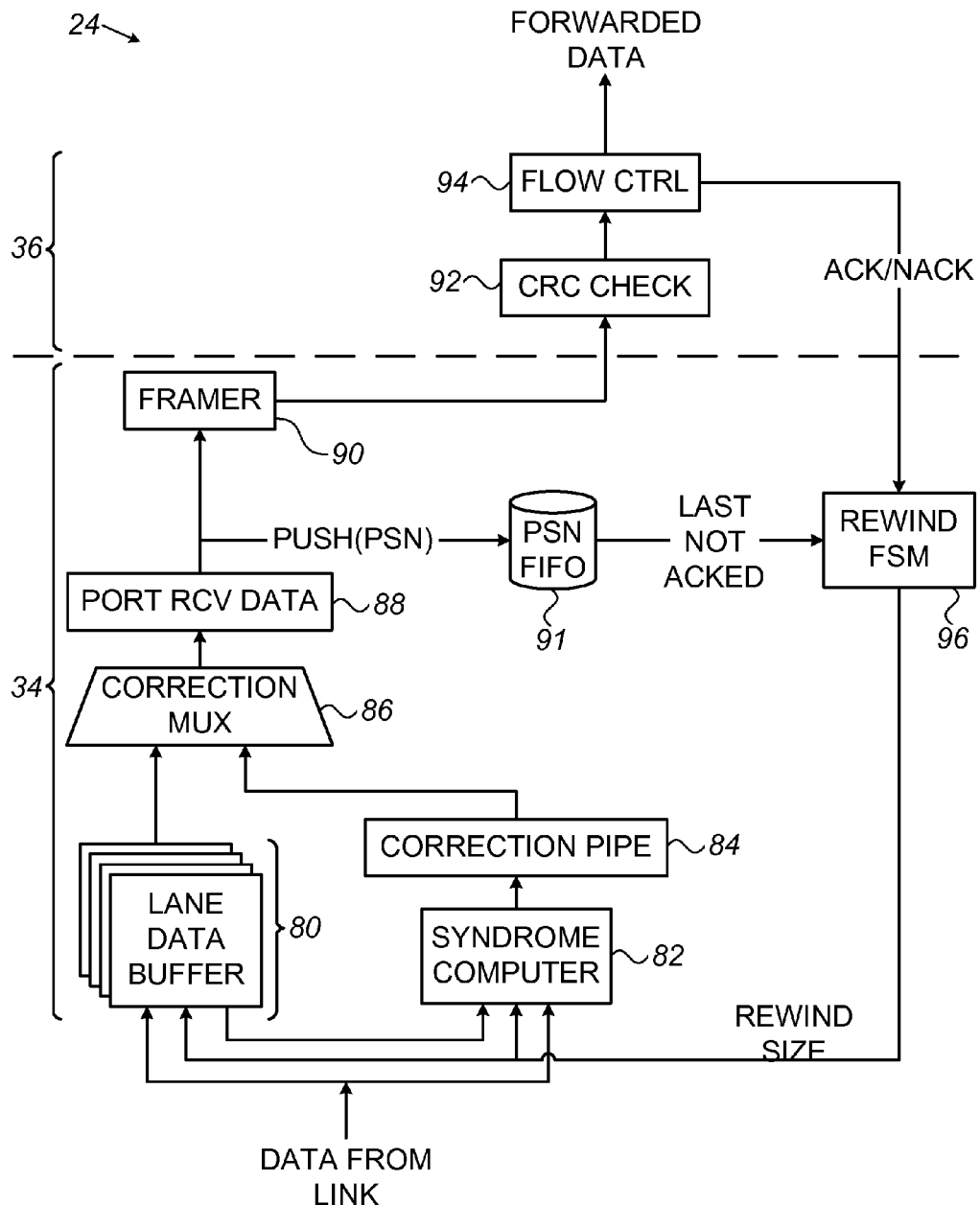
FIG. 3 is a block diagram that schematically shows details of a packet data receiver, in accordance with an embodiment of the invention.

Receiver 24 likewise comprises a PHY interface 34, which receives and decodes the symbols transmitted by PHY interface 30. PHY interface 34 includes an error correction circuit, as shown in FIG. 3, which operates as described below. An input buffer 38 comprises a memory, which buffers the data blocks received by PHY interface 34. A data link layer interface 36 receives the decoded data packets from PHY interface 34 and checks the error detection codes of the packets. Upon detecting an error in a given data packet, data link interface 36 signals PHY interface 34, which then reads from buffer 38 the data block or blocks that contain the given data packet and, when necessary, actuates the error correction circuit to correct the error using the FEC symbols in the buffered data block. Data link layer interface 36 also sends flow control instructions, such as flow credits or pause frames, to its peer data link layer interface 28 in transmitter 22, in order to regulate the rate of transmission by transmitter 22 and thus avoid congestion and possible buffer overflow at receiver 24.

The inset in FIG. 1 shows a sequence 40 of physical layer symbols 42 that are transmitted over link 26. Each symbol 42 encodes one or more bits of data, depending on the encoding scheme in use on link 26. Symbols 42 are arranged in a series of data blocks 44. The symbols in each data block 44 comprise a set of data symbols 46, which encode the transmitted data, and a set of FEC symbols 48, computed over the data encoded in data block 44. Blocks have a predefined block size, which is typically constant from block to block.

Data symbols 46 encode data comprising Layer 2 data packets 50. Data packets 50 have respective packet sizes that are typically different from the block size and can vary from packet to packet. Thus, the packet boundaries of data packets 50 generally do not coincide with the block boundaries of data blocks 44. In the example shown in FIG. 1, packet 50 is relatively large and extends over several data blocks 44. Alternatively, small packets may be contained entirely inside a single data block 44. Packet 50 is typically set off within sequence 40 by one or more start-of-frame (SOF) symbols 52 and end-of-frame (EOF) symbols 54, which enable the receiving PHY interface 34 to identify and pass packets 50 to data link layer interface 36. Packet 50 may be preceded and succeeded in sequence 40 by other packets or by fill (dummy) symbols.

Each packet 50 comprises a header 55, a data payload 56 and an error detection code 58, such as a CRC computed over the header and payload, as provided by applicable standards. Data symbols 46 encode the data bits in these different parts of packet 50 indiscriminately, i.e., without distinguishing between header, payload, and CRC.

Figure 2:
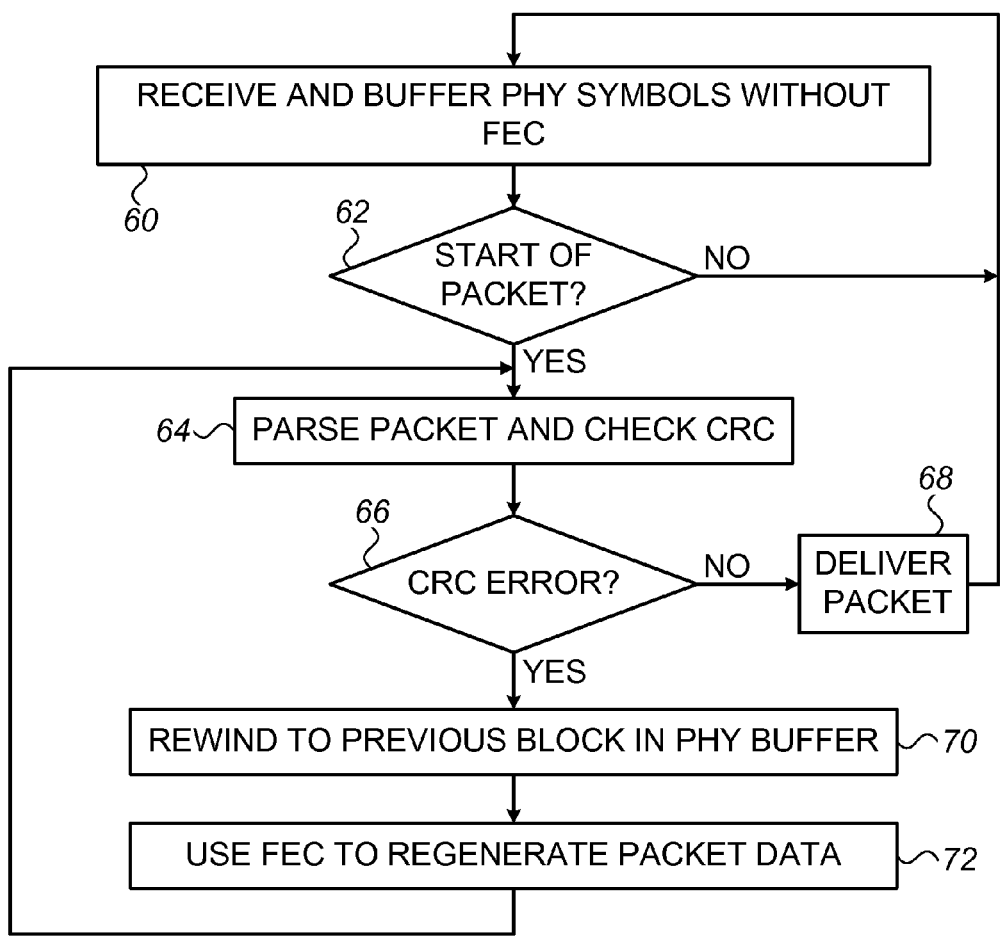
FIG. 2 is a flow chart that schematically illustrates a method for correcting errors in received data, in accordance with an embodiment of the invention.

FIG. 2 is a flow chart that schematically illustrates a method applied by receiver 24 in correcting errors in data received over link 26, in accordance with an embodiment of the invention. The method is described here in general terms, followed by a more detailed description of an example implementation that is shown in FIG. 3.

PHY interface 34 in receiver 24 receives sequence 40 of PHY symbols 42 over link 26 at a data reception step 60. PHY interface 34 decodes the symbols and stores the decoded data temporarily in buffer 38, including both data symbols 46 and FEC symbols 48. PHY interface 34 may also check the decoded data symbols using the FEC symbols, i.e., by computing the syndrome of each received data block 44. The actual error correction (FEC) functionality of the PHY interface, however, is not actuated until an actual error condition occurs, as described below.

PHY interface 34 checks for occurrence of the start of a packet in symbol sequence 40 (as indicated by SOF symbols 52, for example), at a packet checking step 62. Upon encountering the start of a new packet, PHY interface 34 passes the packet data to data link layer interface 36. PHY interface 34 typically starts passing the packet data to data link layer interface 36 immediately upon identifying the start of the packet, without waiting to receive and check the remainder of the current data block. PHY interface 34 may assign respective serial numbers to the data blocks that contain packet data, for use when error correction is actuated as explained further hereinbelow.

Data link layer interface 36 parses each packet in accordance with the applicable data link layer protocol, at a packet parsing step 64. As part of this step, interface 36 computes the CRC (or other error detection code value) over header 55 and payload 56 and compares the result to the value of code 58 in the received packet, at an error checking step 66. If the computed and received CRC values match (as will be the case in the large majority of packets, assuming link 26 to have a low bit-error rate), data link layer interface 24 will pass the packet along for forwarding or other processing, at a packet delivery step 68. The data link layer interface typically also acknowledges to PHY interface 34 that the packet was received without errors, so that the PHY interface can release the corresponding buffers and the assigned block serial numbers. Processing by PHY interface 34 and data link layer interface 36 continues with the next packet at step 60.

If data link layer interface 36 discovers a CRC error at step 66, however, it signals PHY interface 34, for example by passing a negative acknowledgment back to the PHY interface. As noted earlier, data link layer interface typically also uses sends control instructions to transmitter 22 in such a way as to delay transmission of further data packets by the transmitter during the correction of the error. For example, when credit-based flow control is used on link 26, data link layer interface 36 may delay sending further credits to transmitter 22.

In response to the notification at step 66, PHY interface 34 "rewinds" its processing chain to the beginning of the first data block 44 that contained at least a part of the packet 50 in question, at a rewind step 70. In the case of a short packet, the entire packet may have been contained in a single data block, in which case the PHY interface will read only this block from buffer 38. On the other hand, when the packet extended across multiple blocks, the PHY interface rewinds to the beginning of the data block in the buffer that contains the first part of the packet and then replays this block and one or more subsequent data blocks.

When this sort of rewind occurs, PHY interface 34 actuates its error correction circuit to correct the error in the decoded data symbols, using the FEC symbols in the data replayed from buffer 38, at an error correction step 72. PHY interface 34 passes the corrected packet data to data link layer interface 36, which parses and checks the corrected packet at step 64, as described above. The error correction circuit in PHY interface 34 remains active until a predefined quantity of data (for example, a quantity of data equal to twice the maximum size of the packets on link 26) and/or a predefined time period has passed without detection of further errors. At this point, the error correction circuit in PHY interface 34 is deactivated. While the PHY-level error correction is active, receiver 24 operates with added latency of at least one data block 44. By operating the PHY and data link layer interfaces at an internal clock speed that is faster than the transmission speed on link 26, and applying flow control as needed to transmitter 22, however, receiver 24 is able to "catch up" with the transmitted data and return to low-latency operation after the PHY-level error correction is deactivated.

Although the above description relates specifically to actuation of the error correction functionality of PHY interface 34 (at steps 70 and 72) in response to CRC errors detected at step 66, PHY-level error correction may similarly be actuated in response to detection of errors by the PHY interface itself. This sort of PHY-level detection is particularly useful in enabling receiver 24 to respond promptly to errors that occur in large packets, which span two or more data blocks 44.

For this purpose, the error correction circuit in PHY interface 34 operates, before being actuated, in a detection-only mode, in which it checks decoded data symbols 46 using the corresponding FEC symbols 48 at the same time as the data are passed to and processed by data link layer interface 36. Upon encountering a syndrome error in a given data block while in the detection-only mode, PHY interface 34 rewinds to the beginning of the block and actuates the correction mode of the error correction circuit, as in steps 70 and 72 described above. One or more data blocks, including at least the block in which the error was detected, are read from buffer 38 into the error correction circuit, which corrects the syndrome error using the FEC symbols in the block and then passes the corrected block to data link layer interface 36 for further processing. Typically, upon detecting such an error, PHY interface 34 also notifies data link layer interface 36, so that the data link layer interface will discard the erroneous block.

Example Implementation

FIG. 3 is a block diagram that schematically shows details of receiver 24, in accordance with an embodiment of the invention. This figure and the description that follows present an example implementation of the method described above, with interfaces 34 and 36 as marked in the figure and lane data buffers 80 in FIG. 3 corresponding to buffer 38 in FIG. 1. FIG. 3 shows functional components of receiver 24, which are typically implemented in dedicated or programmable hardware logic circuits in one or more integrated circuits, such as an application-specific integrated circuit (ASIC). Alternatively, at least some of the functions of receiver 24 may be performed by a programmable processor under the control of firmware or other software. FIG. 3 shows only the components of receiver 24 that are necessary for an understanding of the error-handling functionality that is described herein. Integration of this functionality into a full-fledged network element, such as a switch or NIC, will be apparent to those skilled in the art after reading the present description.

A decoding circuit (not shown) in PHY interface 34 decodes symbols 42 received from link 26 and passes the corresponding data to buffers 80 and, in parallel, to a syndrome computer 82. Syndrome computer 82 computes the syndrome of each incoming data block 44 in order to detect errors, and passes the results to a correction pipe 84, which is capable of correcting the bit values, as is known in the art. Syndrome computer 82, correction pipe 84 and a correction multiplexer 86 together make up the error correction circuit in PHY interface 34. As long as link maintains a low bit-error rate, however, the error correction functionality of correction pipe 84 and multiplexer 86 is not actuated and thus remains dormant.

Thus, ordinarily the decoded data from link 26 pass through (or around) buffers 80 and multiplexer 86, without added delay, to port data reception logic 88. Logic 88 detects the start and end of each packet (typically based on SOF and EOF symbols 52 and 54) and passes the packet data to a framer 90, which organizes the packet data for data link layer processing. In addition, logic 88 assigns a position serial number (PSN) to each block of data that is passed via framer 90 to data link layer interface 36. Logic 88 queues the PSN values, for example in a first-in first-out (FIFO) memory 91, from which the values are read by rewind logic 96, as explained below. Rewind logic 96 typically implements a finite state machine (FSM), having "play," "rewind," and "replay" states. Logic 96 generally remains in the "play" state as long as no CRC or FEC errors are detected.

A CRC checker 92 in data link layer interface 36 computes a CRC value over header 54 and payload 56 of each packet that is delivered by framer 90, and verifies the computed CRC value against the value of CRC 58 in the received packet. Upon encountering a CRC error, CRC checker 92 marks the corresponding packet as a "bad packet."

After checking by checker 92, the received packets are passed to flow control logic 94, which passes good packets on to forwarding logic (not shown) for forwarding to their destinations, and also returns appropriate flow control instructions to transmitter 22. When CRC checker 92 indicates that a given packet is error-free, flow control logic 94 can typically issue additional flow control credits to transmitter 22 or otherwise permit normal transmission to proceed. In addition, flow control logic 94 returns an acknowledgment (ACK) to rewind logic 96 to indicate that it has processed the data blocks conveyed from PHY interface 34. In response to this ACK, rewind logic 96 pops the corresponding PSN (or PSNs) from FIFO memory 91 and informs buffer 80 that the corresponding data blocks can be overwritten.

On the other hand, when CRC checker 92 encounters a bad packet, it notifies flow control logic 94, which instructs transmitter 22 to delay transmission of further data on link (for example, by not sending additional flow control credits to the transmitter) and signals a negative acknowledgment (NACK) to rewind logic 96. In response to the NACK, rewind logic 96 switches to the rewind state and reads, from FIFO memory 91, the PSN of the last block that was not acknowledged by flow control logic 94. The rewind logic rewinds PHY interface 34 to this (presumably erroneous) data block. This block is read ("replayed") from buffer 80 as input to syndrome computer 82 and from there to correction pipe 84, which is now actuated. At this stage, rewind logic 96 enters the replay state.

Correction pipe 84 computes the required bit correction or corrections in the data block indicated by rewind logic 96. The block in which the error was detected is replayed from buffer 80, and multiplexer 86 inserts the corrected bit values into the block as it is passed to port data reception logic 88. Logic 88 once again detects the start of the packet in the replayed block, passes the packet to framer 90, and assigns and inserts a new PSN value into FIFO memory 91 while clearing the previous PSN values from the memory. CRC checker 92 again checks the packet and passes the results to flow control logic 94. Assuming no further CRC error is detected at this stage, logic 94 forwards the packet, signals an ACK to rewind logic 96, and sends appropriate flow control instructions to transmitter 22. Once the replay of data blocks from buffer 80 is complete, correction pipe 84 and multiplexer 86 will again be deactuated, and logic 94 will return to its normal "play" state.

As noted earlier, although the embodiments described above take advantage of flow control on link 26 in order to prevent overflow of buffer 38 during rewind and replay stages, the methods of "on-demand" error correction that are illustrates in FIGS. 2 and 3 may alternatively be implemented without reliance on such flow control. For example, input buffer 38 may be made large enough to handle the extra data that can accumulate during error handling, without informing transmitter 22 of the availability of this extra buffer space. Receiver 24 may also monitor the fill level of buffer 38 and activate correction pipe 84 when the buffer level passes a certain threshold, even when no error has been detected, in order to avoid that possibility of data loss in case an error does occur. Once the buffer fill has dropped to a safe level, correction pipe 84 can again be deactivated to restore the normal, low-latency operation of the receiver.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a physical layer (PHY) interface, which is configured to receive over a communication link and to decode a sequence of symbols arranged in a series of data blocks, the symbols in each data block comprising a first set of data symbols that encode data, which comprise data packets containing respective error detection codes, and a second set of forward error correction (FEC) symbols computed over the data encoded in the data block, the PHY interface comprising an error correction circuit, which is configured, when actuated, to correct errors in the decoded data symbols using the FEC symbols;
a memory, configured to buffer the data blocks received by the PHY interface; and
a data link layer interface, which is coupled to receive the data packets from the PHY interface, to check the data packets using the respective error detection codes, and upon detecting an error in a given data packet, to signal the PHY interface to read from the memory at least one buffered data block that contains the given data packet while actuating the error correction circuit to correct the error using the FEC symbols in the at least one buffered data block, and following correction of the error, to return the given data packet to the data link interface for further processing.

2. The apparatus according to claim 1, wherein the error correction circuit is not actuated until the error is detected by the data link layer interface, and is deactuated when error-free reception has been restored after processing the given data packet.

3. The apparatus according to claim 1, wherein the data link interface is configured to send flow control instructions over the communication link to a transmitter of the data so as to delay transmission of further data packets by the transmitter during the correction of the error.

4. The apparatus according to claim 1, wherein the data blocks have a predefined block size, and wherein the data packets have respective packet sizes that are different from the block size and have packet boundaries that do not coincide with block boundaries of the data blocks.

5. The apparatus according to claim 4, wherein the at least one buffered data block that contains the given data packet comprises a plurality of the buffered data blocks that together contain the given data packet and which are processed by the error correction circuit in order to correct the error in the given data packet.

6. The apparatus according to claim 1, wherein the error correction circuit is configured, before being actuated, to check the decoded data symbols using the FEC symbols, and upon encountering a syndrome error in a given data block, to enter an actuated mode and while in the actuated mode, to read from the memory at least the given data block, to correct the syndrome error using the FEC symbols in the given data block, and following correction of the syndrome error, to pass the given block to the data link interface for further processing.

7. The apparatus according to claim 1, wherein the PHY interface comprises:
packet detection logic, which is configured to assign respective serial numbers to the data blocks that are conveyed from the PHY interface to the data link layer interface; and
rewind logic, which is configured to receive a signal from the data link layer interface indicating that the error was detected and responsively to the signal and to the assigned serial numbers, to select the at least one buffered data block to be input to the error correction circuit.

8. The apparatus according to claim 7, wherein the data link layer interface is configured to acknowledge to the rewind logic that it has processed the data blocks conveyed from the PHY interface, and to signal the error by passing a negative acknowledgment to the rewind logic.

9. A method for communication, comprising:
in a physical layer (PHY) interface, receiving over a communication link and decoding a sequence of symbols arranged in a series of data blocks, the symbols in each data block comprising a first set of data symbols that encode data, which comprise data packets containing respective error detection codes, and a second set of forward error correction (FEC) symbols computed over the data encoded in the data block;
buffering in a memory the data blocks received by the PHY interface;
passing the data packets from the PHY interface to a data link layer interface;
in the data link layer interface, checking the data packets using the respective error detection codes, and upon detecting an error in a given data packet, signaling the PHY interface to read from the memory at least one buffered data block that contains the given data packet and to actuate an error correction function in the PHY interface to correct the error using the FEC symbols in the at least one buffered data block; and
following correction of the error, returning the given data packet to the data link interface for further processing.

10. The method according to claim 9, wherein the error correction function is not actuated until the error is detected by the data link layer interface, and the method comprises deactuating the error correction function when error-free reception has been restored after processing the given data packet.

11. The method according to claim 9, and comprising sending flow control instructions from the data link layer interface over the communication link to a transmitter of the data so as to delay transmission of further data packets by the transmitter during the correction of the error.

12. The method according to claim 9, wherein the data blocks have a predefined block size, and wherein the data packets have respective packet sizes that are different from the block size and have packet boundaries that do not coincide with block boundaries of the data blocks.

13. The method according to claim 12, wherein the at least one buffered data block that contains the given data packet comprises a plurality of the buffered data blocks that together contain the given data packet and which are processed by the error correction function in order to correct the error in the given data packet.

14. The method according to claim 9, and comprising:
before actuating the error correction function, checking the decoded data symbols in the PHY interface using the FEC symbols; and
upon encountering a syndrome error in a given data block, actuating the error correction function to read from the memory at least the given data block, correcting the syndrome error using the FEC symbols in the given data block, and following correction of the syndrome error, passing the given block to the data link interface for further processing.

15. The method according to claim 9, wherein passing the data packets comprises assigning respective serial numbers to the data blocks that are conveyed from the PHY interface to the data link layer interface, and wherein actuating the error correction function comprises selecting, in response to the signaling from the data link layer interface indicating that the error was detected and to the assigned serial numbers, the at least one buffered data block for application of the error correction function thereto.

16. The method according to claim 15, wherein signaling the PHY interfaces comprises acknowledging, by the data link layer interface to the PHY interface, that the data link layer interface has processed the data blocks conveyed from the PHY interface, and signaling the error by passing a negative acknowledgment to the PHY interface.

* * * * *